Figure 1:
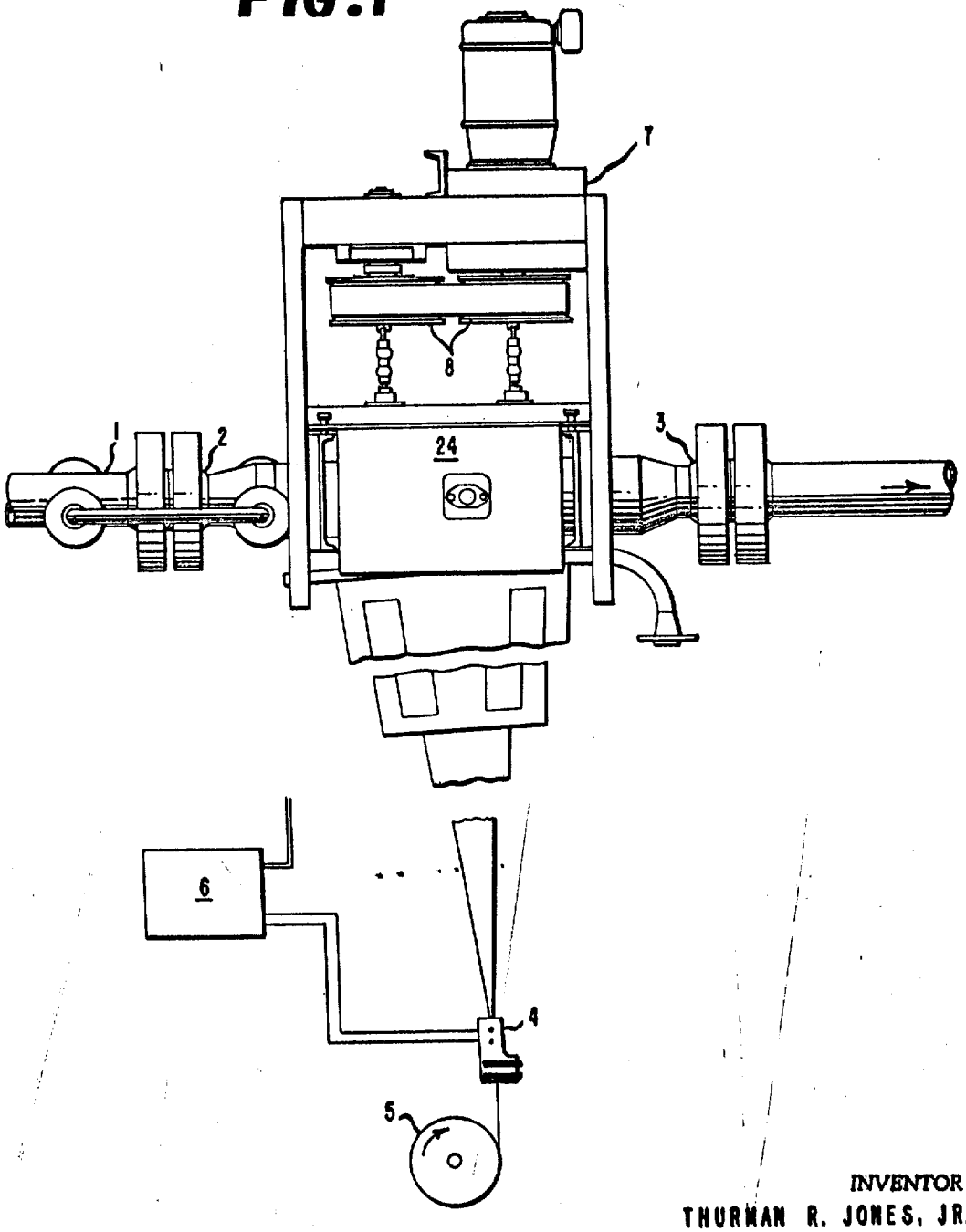
Figure 4:
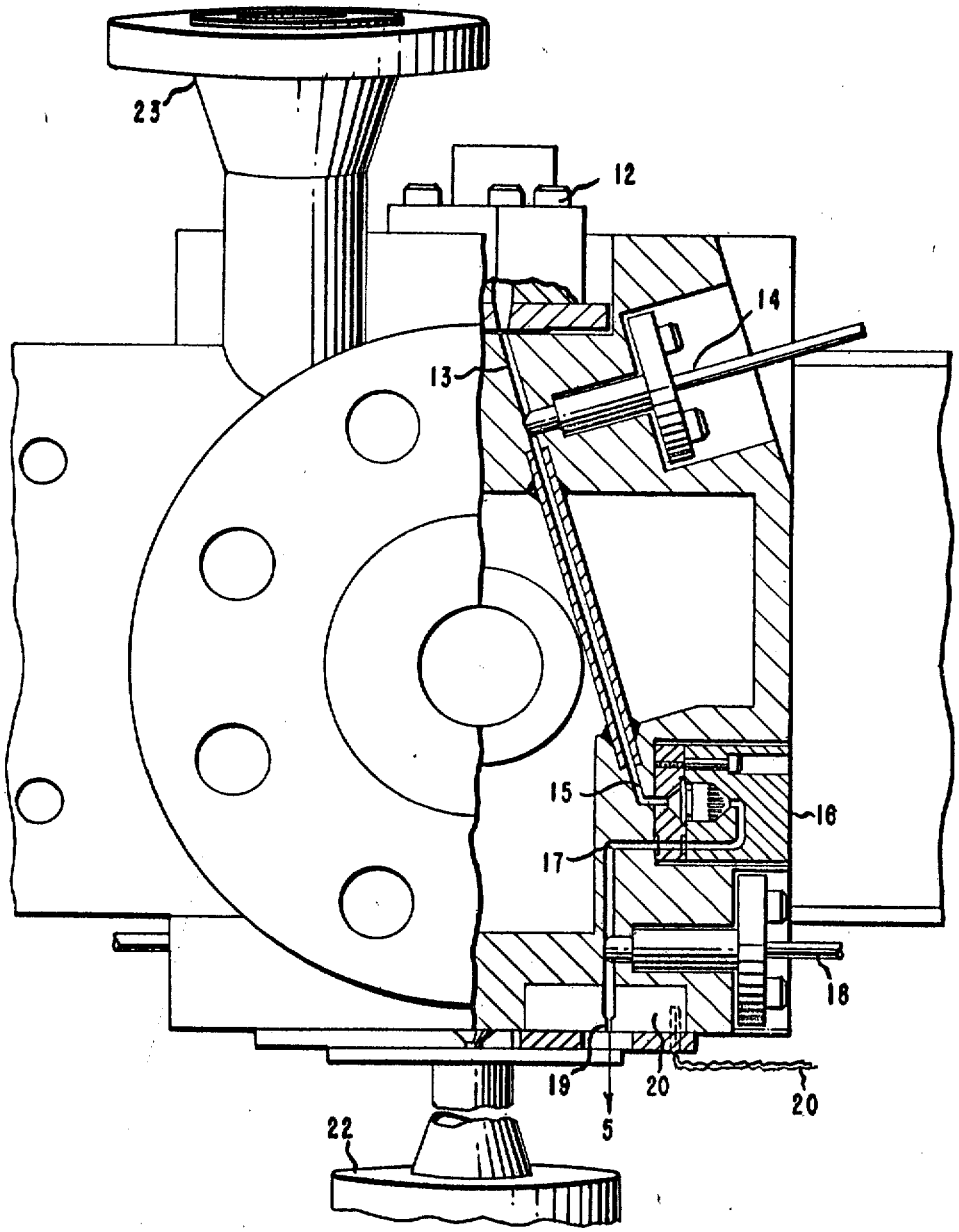

264-40.1 SR
C8097 XR T 857,047

DEC 24 1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1040

698,961

PROCESS AND APPARATUS FOR MONITORING POLYMER RHEOLOGICAL PROPERTIES IN A MELT-SPINNING OPERATION

Thurman Ralston Jones, Jr., Greenville, N.C., asignor to E. I. du Pont de Nemours and Company, Wilmington, Del., a corporation of Delaware Filed Jan. 18, 1968. Published Dec. 24, 1968
Class 264—40
4 Sheets Drawings. 12 Pages Specification

FIG. 7

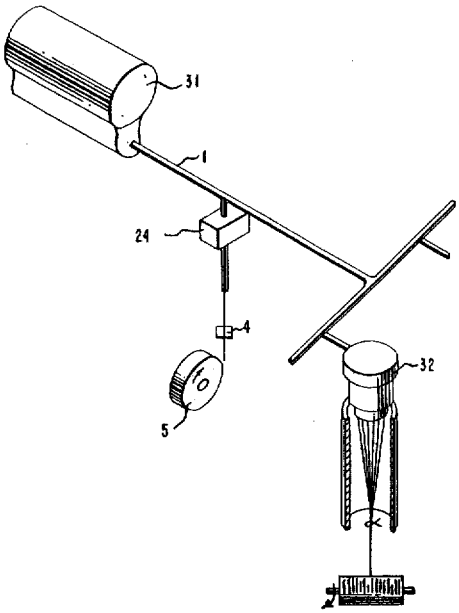

In the process of melt spinning synthetic polymer to filaments, the improvement in monitoring polymer rheological properties comprising conveying a sample portion of the polymer from a transfer line transporting molten polymer from a reactor to a spinning machine, extruding the sample portion of polymer at substantially a constant flow rate through a viscometer having a filter and a measuring capillary and pressure sensing means between filter and capillary while maintaining the molten polymer at the desired temperature with heat control means; quenching the extruded polymer to form a filament; and then, marking said filament when said pressure is outside of preset limits to indicate the portion of said filament formed of off-specification polymer. The marked portion may subsequently be subjected to analysis to determine reasons for variation from specification. Separate sample streams may be simultaneously withdrawn from axial and wall areas of the transfer line, if desired. Parallel measuring capillaries of different diameters, each with a separate pressure sensing means, may be used to indicate the effect of shear stress on polymer viscosity. Also disclosed is an apparatus for carrying out the process.

264-40.1
C8097

SR

XR T 857,047

Draw 1 of 3

INVENTOR
THURMAN R. JONES, JR.

BY E. Leigh Hunt
ATTORNEY 264-40.1
C8097 XR T 857,047 SR Draw 2 of 3

INVENTOR
THURMAN R. JONES, JR.

BY C. Leigh Hunt
ATTORNEY 264-40.1
C8097
SR
XR T 857,047
Draw 3 of 3
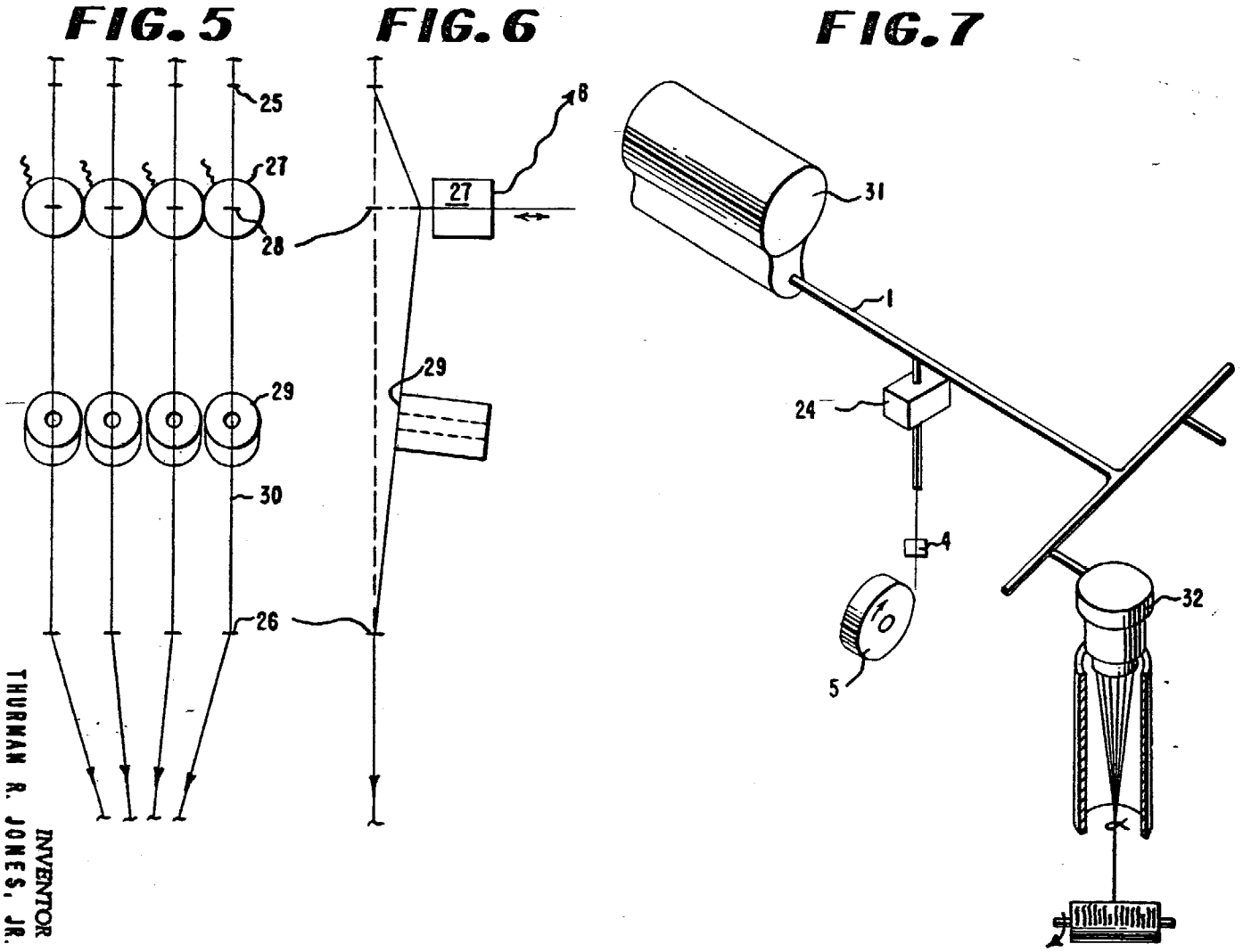
INVENTOR
THURMAN R. JONES, JR.
BY E. Leigh Hunt
ATTORNEY